Figure 1:
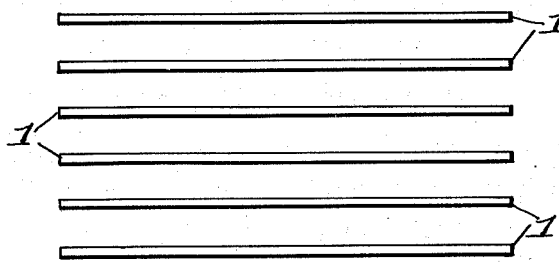

Jan. 11, 1938.  A. A. ROBINSON  2,105,268
LAMINATED PRODUCT
Filed Oct. 17, 1935

Fabric Impregnated with Soluble Blood Binder.

Consolidated Laminated Product.

Inventor:
Adrian A. Robinson,
By Dyrenforth, Lee, Chritton & Wiles,
Attys.

Patented Jan. 11, 1938

2,105,268

UNITED STATES PATENT OFFICE 2,105,268

LAMINATED PRODUCT

Adrian A. Robinson, Chicago, Ill., assignor to Wilson & Co., Inc., a corporation of Delaware Application October 17, 1935, Serial No. 45,501

1 Claim. (Cl. 154—45.9)

This invention relates to a laminated product, and particularly to a laminated material comprising layers of fabric impregnated with a solution of blood and consolidated under heat and pressure.

The invention is illustrated in the drawing, in which—

Figure 2:
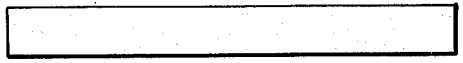

Fig. 1 is a diagrammatic vertical section through a plurality of separate layers of fabric I, which are indicated as impregnated with a blood solution; and Fig. 2 illustrates a similar vertical section through a compacted block.

In accordance with this invention, a plurality of layers of fabric, for example, paper, linen, cotton, muslin, or other vegetable, animal, or mineral fabric are impregnated with a solution of blood and are then dried and subsequently consolidated under heat and pressure.

As an example of the invention, a number of layers of a fabric such as a stiff paper, say from one to twenty thousandths inch thick, are impregnated with a solution of blood. The fabric should be treated with sufficient blood to consolidate it properly, and preferably sufficient to obliterate substantially visual evidence of the laminations. It is preferred to use sufficient blood solution so that when dried the sheets will contain from thirty to eighty percent blood and from seventy to twenty percent fabric. The number of sheets used is determined by the thickness of the panel desired. After the sheets have been dried, preferably separately, they are piled in the desired number and consolidated by heat and pressure. The pressure should be not less than five hundred pounds per square inch, preferably one thousand pounds per square inch, and the temperature may be approximately from 250° to 400° F. and preferably about 300° F. The pressing time will depend upon the thickness of the panel, for panels of the thickness of one-eighth inch, a pressing time of 10 minutes is generally sufficient.

A preferred form of blood solution is that disclosed in my co-pending application, Serial No. 11,508, filed March 16, 1935, in which the blood contains from thirty to forty percent blood solids and the hemoglobin is substantially unruptured.

The laminated panel produced in accordance with the method just described is much cheaper than present laminated materials. At the same time, a laminated panel so prepared is not brittle and is exceedingly tough, and is believed to lend itself better to punching and shearing to desired shapes and sizes.

As a specific example of the process, 12 to 15 sheets of 60-pound alpha cellulose paper having a thickness of approximately .0135 inch were impregnated with sufficient blood solution to produce when dry a paper containing fifty percent by weight of blood. After drying, the sheets were piled together and pressed at a temperature of 300° F. under a pressure of 1000 pounds per square inch, the heating taking about ten minutes, and then cooled. The resulting panel had a thickness of approximately one-eighth inch and was a black-colored tough material.

In certain instances where it is desired that the laminated material shall have water-resisting properties, the blood solution is combined with a dispersion of synthetic resin, preferably in water. Such a synthetic resin may be a phenol-formaldehyde, urea-formaldehyde, phenol-furfural, or other synthetic resin. As in the case of unmixed blood, it is preferred that the sheet will contain eighty to thirty percent binding agent. The binding agent preferably contains from ninety to fifty percent blood and ten to fifty percent synthetic resin.

As an example of this process, sheets of alpha cellulosic paper similar to that described above were treated with sufficient blood and resin solutions so that when dried the sheets contained thirty-five percent blood and fifteen percent resin by weight. In this case, the synthetic resin was a water-dispersable phenol-formaldehyde resin. The sheets were consolidated under the same pressure and temperature above given and produced a laminated panel about one-eighth inch in thickness, which, in addition to being tough and easily punched and sheared, was considerably more resistant to water absorption than the one prepared from unmixed blood. At the same time, the flow of the laminated material was better.

It is possible to produce laminated articles without impregnating the various layers with solutions of the blood or blood and resin, for example, by interspersion of a powder between the various fabric layers. Such a powder is described in my co-pending application, Serial No. 45,502 filed October 17, 1935. This method is more effective in connection with the combined blood and synthetic resin than with the blood alone, but it is much preferred to use the solution in either case.

The foregoing detailed description has been given for clearness of understanding only, and no unnecessary limitations should be understood therefrom, but the appended claim should be construed as broadly as permissible, in view of the prior art.

What I claim as new and desire to secure by Letters Patent is:

A laminated product comprising a plurality of layers of porous fabric impregnated substantially uniformly throughout with a binder comprising soluble blood and a synthetic resin, the binder when dry being thirty to eighty per cent by weight of the fabric and the blood being from fifty to ninety per cent of the binder, the layers being consolidated under heat and pressure to produce a tough flexible highly waterproof laminated product.

ADRIAN A. ROBINSON.